US006721243B2

(12) United States Patent
Joo et al.

(10) Patent No.: US 6,721,243 B2
(45) Date of Patent: Apr. 13, 2004

(54) METHOD FOR DETECTING SERVO ERROR, APPARATUS THEREFOR, DISK WHICH MAINTAINS QUALITY OF SERVO ERROR SIGNAL, METHOD OF CONTROLLING SERVO OF DISK RECORDING/ REPRODUCING APPARATUS, METHOD OF DETECTING TRACKING ERROR, AND METHOD OF DETECTING TILT ERROR

(75) Inventors: Seong-sin Joo, Suwon (KR); In-sik Park, Suwon (KR); Byung-in Ma, Suwon (KR); Chong-sam Chung, Sungnam (KR); Jang-hoon Yoo, Seoul (KR); Jung-wan Ko, Yongin (KR); Kyung-geun Lee, Sungnam (KR); Joong-eon Seo, Euiwang (KR)

(73) Assignee: Samsung Electronics Co., Ltd., Suwon (KR)

( * ) Notice: Subject to any disclaimer, the term of this patent is extended or adjusted under 35 U.S.C. 154(b) by 79 days.

(21) Appl. No.: 10/378,904

(22) Filed: Mar. 5, 2003

(65) Prior Publication Data

US 2003/0128637 A1 Jul. 10, 2003

Related U.S. Application Data

(62) Division of application No. 09/629,049, filed on Jul. 31, 2000, which is a division of application No. 09/385,415, filed on Aug. 30, 1999, now Pat. No. 6,469,979.

(30) Foreign Application Priority Data

| Aug. 29, 1998 | (KR) | ............................................. 98-35421 |
| Aug. 29, 1998 | (KR) | ............................................. 98-35422 |
| Mar. 13, 1999 | (KR) | ........................................ 1999-8482 |

(51) Int. Cl.$^7$ ................................................ G11B 7/00
(52) U.S. Cl. ............................... 369/44.26; 369/44.28; 369/47.1; 369/53.23
(58) Field of Search ........................... 369/44.11, 44.26, 369/44.27, 44.28, 44.34, 44.41, 47.1, 53.1, 53.23, 53.19, 59.1, 275.1, 275.3

(56) References Cited

U.S. PATENT DOCUMENTS

| 4,589,103 | A | | 5/1986 | Tajima |
| 5,523,989 | A | | 6/1996 | Ishibashi |
| 5,732,054 | A | | 3/1998 | Marino et al. |
| 5,815,485 | A | * | 9/1998 | Tanaka et al. ........... 369/44.26 |
| 6,324,030 | B1 | * | 11/2001 | Cheung et al. .......... 360/77.08 |

FOREIGN PATENT DOCUMENTS

| DE | 40 28 703 A1 | 3/1992 |
| EP | 0210330 A2 | 2/1987 |
| EP | 0467 498 A2 | 1/1992 |
| GB | 2307770 A | 6/1997 |

* cited by examiner

Primary Examiner—Muhammad Edun
(74) Attorney, Agent, or Firm—Staas & Halsey LLP

(57) ABSTRACT

A method of detecting a servo error, an apparatus therefor, a disk which maintains quantity of a servo error signal, a method of controlling a servo of an apparatus for recording data on and reproducing data from a disk, a method of detecting the tracking error, and a method of detecting tilt error of the apparatus. The apparatus for recording data on and reproducing data from the disk in which a recording area is divided into sectors, each sector has a header for indicating an address, each header has a first header and a second header which are recorded to deviate from the center of the track in opposite directions, and the first header and the second header have address areas in which the addresses of sectors are recorded and synchronous signal areas in which synchronous signals for detecting the address signals recorded in the address area are recorded. As a result, it is possible for the recording/reproducing apparatus to stably control a servo therein and maintain an optimal recording/ reproducing state since the apparatus for detecting the servo error correctly detects the servo error state of the disk.

21 Claims, 8 Drawing Sheets

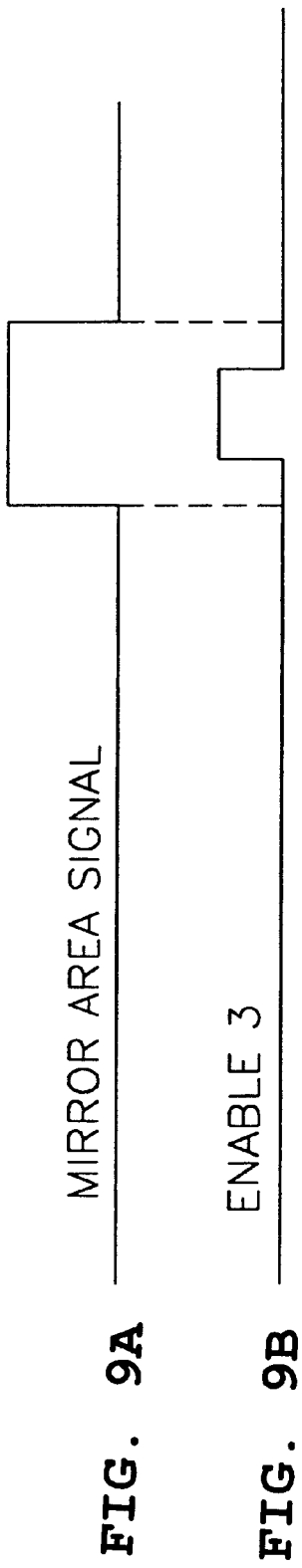
FIG. 9A MIRROR AREA SIGNAL
FIG. 9B ENABLE 3
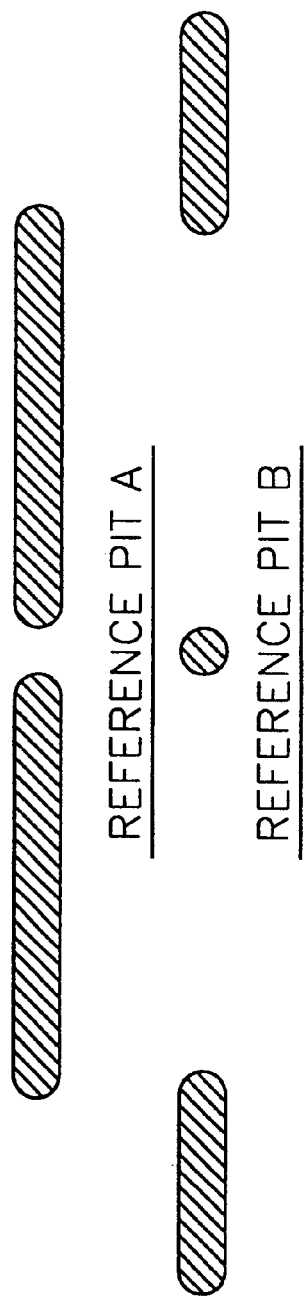
FIG. 10

METHOD FOR DETECTING SERVO ERROR, APPARATUS THEREFOR, DISK WHICH MAINTAINS QUALITY OF SERVO ERROR SIGNAL, METHOD OF CONTROLLING SERVO OF DISK RECORDING/ REPRODUCING APPARATUS, METHOD OF DETECTING TRACKING ERROR, AND METHOD OF DETECTING TILT ERROR

This application is a divisional of prior application Ser. No. 09/629,049, filed Jul. 31, 2000, now allowed, which is a divisional of application Ser. No. 09/385,415, filed Aug. 30, 1999, now U.S. Pat. No. 6,469,979.

CROSS-REFERENCE TO RELATED APPLICATIONS

This application claims the benefit of Korean Application Nos. 98-35421, filed Aug. 29, 1998, 98-35422, filed Aug. 29, 1998, and 99-8482, filed Mar. 13, 1999, in the Korean Patent Office, the disclosures of which are incorporated herein by reference.

BACKGROUND OF THE INVENTION

1. Field of the Invention

The present invention relates to an optical recording/ reproducing apparatus for recording digital data on a disk and reproducing digital data from a disk, and more particularly, to a method for detecting servo error by comparing the levels of synchronous signals recorded on the header area of a disk, an apparatus suitable for the method, a disk which guarantees the quality of a push-pull signal which is the basis of optimally controlling the servo, a method for controlling the servo of the recording/ reproducing apparatus, a method for detecting a tracking error, and a method for detecting a tilt error.

2. Description of the Related Art

The quality of a signal remarkably deteriorates due to a servo error such as the tilt and detrack of a disk as recording density becomes higher not only in a disk only for reproduction such as a DVD-ROM but also in a recordable disk such as a DVD-RAM. In particular, in the recordable disk, the recording quality deteriorates due to the influence of the servo error when the servo error exists during recording and the deterioration of the quality of the signal becomes severe due to the servo error during the reproduction of a concerned part.

In a DVD-RAM disk, information is recorded on a track. The track is comprised of a land track and a groove track. The land track and the groove track alternate when the disk rotates once. The land track and the groove track are alternated in the DVD-RAM disk in order to provide a tracking guide in an initial stage and to reduce crosstalk between adjacent tracks in high density narrow tracks.

Each track is comprised of sectors having a uniform length. A pre-embossed header area is provided during the manufacturing of the disk as a means of physically dividing the sectors. The physical addresses of the sectors are recorded in the pre-embossed header area.

Each sector is comprised of a header area in which physical identification data (PID) is recorded and a data area.

FIG. 1A shows the physical shape of the land track in a DVD-RAM disk. FIG. 1B shows the waveform of a push-pull signal in the land track.

The header area is repeatedly arranged in every sector of the track. Four PIDs (PID1 through PID4) having the same value are recorded in one header area. The PID1 and the PID2 are arranged to deviate from the center of the track by a certain amount and the PID3 and the PID4 are arranged to deviate from the center of the track in a direction opposite to that of the PID1 and PID2 so that the PIDs can be correctly read even if a laser spot 25 deviates from the center of the track. Also, the arrangements of the PID1 and PID2 and the PID3 and PID4 in the land track are opposite to those in the groove track. The push-pull signal shown in FIG. 1B can be obtained in the land track.

FIG. 2A shows the physical shape of the groove track in a DVD-RAM disk.

FIG. 2B shows the waveform of the push-pull signal in the groove track.

FIG. 3 shows the enlarged header area shown in FIGS. 1A and 2A. In the structure of the header area, the PID1 and PID2 and the PID3 and PID4 are arranged to deviate from the center of the track in opposite directions by a uniform amount. A vfo signal having a specified frequency for synchronizing and detecting ID and an ID signal showing the physical addresses of the sectors are recorded in the respective PIDs. The vfo signal has a recording pattern of 4T (T is a period of the clock signal).

As shown in FIG. 3, the header area is comprised of vfo1 33 and ID1 (PID1) 34, vfo2 35 and ID2 (PID2) 36, vfo3 37 and ID3 (PID3) 38, and vfo4 39 and ID4 (PID4) 40.

In FIG. 3, when the laser spot passes through the header area of the groove track, a push-pull signal RF_pp shown in FIG. 4A and a sum signal RF_sum shown in FIG. 4B are obtained. In FIG. 4A, a vfo1 signal 42 corresponds to the vfo1 signal area 33 of FIG. 3. A vfo3 signal 43 corresponds to the vfo3 signal area 37.

FIG. 5 shows the structure of an apparatus for obtaining the push-pull signal shown in FIG. 4A and the sum signal shown in FIG. 4B. In FIG. 5, reference numeral 50 denotes a photodetector divided into four sections. Reference numerals 52 and 54 denote adders. Reference numeral 56 denotes a calculator.

The apparatus shown in FIG. 5 outputs the sum signal RF_sum of signals detected by light receiving elements A through D of the photodetector divided into four, sum signals V1 and V2 of radial pairs B and C, and A and D of respective light receiving elements, and the push-pull signal RF_pp which is a subtraction signal V2−V1 of V1 and V2.

FIG. 10 shows a conventional technology for compensating for tilt and a method for detecting the amount of tilt by a specific pattern recorded on the track of a disk. The specific pattern coincides with the proceeding direction of the track and the center of the track and is realized in the form of a reference pit A and/or a reference pit B.

It is possible to obtain tilt information by comparing signals reproduced from the reference patterns shown in FIG. 10 with each other and to thus operate tilt compensating equipment according to the obtained tilt information or to compensate for the signals by changing the equalizer coefficient of the reproducing signal.

The reference patterns shown in FIG. 10 are located in an arbitrary position in the disk and are useful for detecting tangential tilt (tilt in a track direction).

However, in the conventional technology shown in FIG. 10, the length of the reference pattern for detecting the tilt is too short. Another pattern is necessary in order to detect the correct position of the tilt pattern. Also, radial tilt (tilt in a radial direction) cannot be detected. Since the radial tilt is larger than the tangential tilt in practice, the reference patterns are not so useful.

Since it is necessary to precisely manage the servo for the recording/reproducing apparatus to maintain an optimal recording/reproducing state, it is necessary to manage the servo error signal in high resolution.

However, the precision of the servo error signal varies depending on the disk or the reproducing apparatus. Accordingly, it is difficult to precisely manage the servo.

SUMMARY OF THE INVENTION

To solve the above problem, it is a first object of the present invention to provide an improved method of detecting a servo error.

It is a second object of the present invention to provide an apparatus for detecting a servo error suitable for the above method.

It is a third object of the present invention to provide a disk having an improved specification for maintaining the quality of a reproducing signal which is the basis of optimally controlling a servo.

It is a fourth object of the present invention to provide a method of controlling the servo of a recording/reproducing apparatus.

Additional objects and advantages of the invention will be set forth in part in the description which follows and, in part, will be obvious from the description, or may be learned by practice of the invention.

Accordingly, to achieve the first and other objects of the present invention, there is provided a method of detecting servo error of an apparatus for recording data on and reproducing data from a disk in a data area of which reference patterns having a uniform size are recorded, wherein the servo error of the recording/reproducing apparatus is detected by the ratio of the magnitude of the reference patterns recorded on at least two positions separated from each other to the magnitude of the reproducing signal corresponding to the reference patterns.

To achieve the second and other objects of the present invention, there is provided an apparatus for recording data on and reproducing data from a disk in which a recording area is divided into sectors, each sector has a header for notifying an address, each header has a first header and a second header which are recorded to deviate from the center of a track in opposite directions, and the first header and the second header each have address areas in which the addresses of sectors are recorded and synchronous signal areas in which synchronous signals for detecting the address signals recorded in the address area are recorded, the apparatus comprising a reproducing signal generator for generating a reproducing signal including sum signals V1 and V2 of radial pairs, a sum signal RF_sum, and a push-pull signal RF_pp from an optical signal reflected from the disk, a header area detector for generating a header area signal comprising a header area from the reproducing signal received from the reproducing signal generator, a first synchronous signal level detector for receiving the output of the reproducing signal generator and detecting a magnitude Ivfo1 of a synchronous signal in the first header by being synchronized with the header area signal received from the header area detector, a second synchronous signal level detector for receiving the output of the reproducing signal generator and detecting a magnitude Ivfo3 of a synchronous signal in the second header by being synchronized with the header area signal received from the header area detector, and a balance calculator for calculating the balance of the magnitude Ivfo1 of the first synchronous signal detected by the first synchronous signal level detector and the magnitude Ivfo3 of the second synchronous signal detected by the second synchronous signal level detector.

To achieve the third and other objects of the present invention, there is provided a disk in which, when the magnitude of a synchronous clock signal in a peak header is Ivfo1 and the magnitude of the synchronous clock signal in a bottom header is Ivfo3, the ratio of the magnitude of Ivfo1 to the magnitude of Ivfo3 has a predetermined restricted value.

To achieve the fourth and other objects of the present invention, there is provided a method of controlling a servo in which, when the magnitude of the synchronous clock signal in the peak header is Ivfo1 and the magnitude of the synchronous clock signal in a bottom header is Ivfo3, tilt is controlled so that the ratio of the magnitude of Ivfo1 to the magnitude of the Ivfo3 satisfies a predetermined restricted value.

BRIEF DESCRIPTION OF THE DRAWINGS

The above object and advantages of the present invention will become more apparent by describing in detail a preferred embodiment thereof with reference to the attached drawings, in which:

FIGS. 9A through 9B show waveforms generated during the operation of the apparatus shown in FIG. 8;

FIG. 10 shows a conventional technology for correcting tilt;

DESCRIPTION OF THE PREFERRED EMBODIMENTS

Figure 1A:
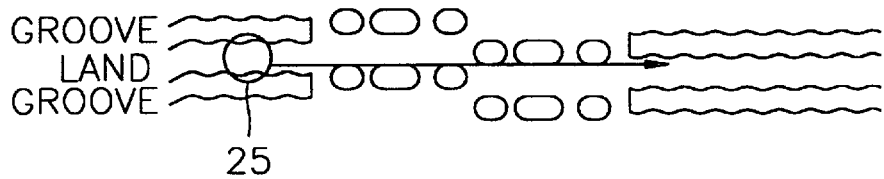
FIG. 1A shows the physical shape of a land track.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

For example, in a push-pull signal, the ratio of the magnitude of the signal PID1 and PID2 to the magnitude of the signal PID3 and PID4 varies by up to 30%, depending on the disk. When such signals are used as reference signals for controlling a servo, it is difficult to precisely manage the servo and maintain optimal recording/reproducing states.

In a method for detecting the servo error according to an embodiment of the present invention, a servo error is detected by the ratio of the magnitude of reference patterns regularly recorded on a disk to the magnitude of a reproducing signal corresponding to the reference patterns. Reference patterns could include a synchronous signal recorded in a header area and a wobble signal recorded in the direction of a track of a disk.

First, a method of detecting the servo error using the synchronous signal recorded in the header area will be described. When the optical axis of a laser spot is vertical to the header area, namely, when tilt in a radial direction does not occur, the magnitude (Ivfo1) of a detected vfo1 signal is approximately equal to the magnitude (Ivfo3) of a vfo3 signal. However, in the case that tilt or detrack occurs, when either the Ivfo1 or the Ivfo3 becomes large, the other becomes small. The tilt in the radial direction denotes a case in which the disk is slanted in the radial direction of the disk, and the tilt in a tangential direction denotes a case in which the disk is slanted in a tracking direction of the disk. The directions made by the radial tilt and the tangential tilt are offset by 90°.

This is because the intensity of light reflected from the PID1 and PID2 and the PID3 and PID4, which are arranged to deviate from the center of the track in opposite directions, varies in relation to the tilt of the disk although the light spot tracks the center of the track. When the disk is tilted to an inner side, the intensity of light reflected from an upper header (a peak header) is larger than that reflected from a lower header (a bottom header) as shown in FIGS. 1A through 2A. For the description of this disclosure, the disk is divided into an inner side and an outer side with respect to the position of an optical pickup (not shown). Thus, the inner side is from the position of the optical pickup to the center of the disk and the outer side is from the position of the optical pickup to the edge of the disk.

Accordingly, the ratio of the magnitude Ivfo1 of the vfo1 signal to the magnitude Ivfo3 of the vfo3 signal varies. Also, the ratio of the magnitude Ivfo2 of a vfo2 signal to the magnitude Ivfo4 of a vfo4 signal varies.

In order to detect the degree to which the magnitude ratio varies, a signal recorded at a uniform level should be used. Since vfo signals have uniform recording levels and frequencies, the vfo signals are suitable for this purpose. The vfo signals are similar to servo burst signals in a hard disk drive and are physically recorded on the disk. The vfo signals are recorded on the disk at a uniform level, but the size of the signals reproduced from the region of the vfo signals is affected by tilt. Also, it is easier to detect the magnitude of the vfo1 and vfo3 signals than that of the vfo2 and vfo4 signals.

Here, when the magnitudes of the synchronous signals detected in the vfo1 and vfo3 areas are Ivfo1 and Ivfo3, respectively. A balance value K is defined as follows.

$$K=(Ivfo_1-Ivfo_3)/(Ivfo_1+Ivfo_3) \quad (1)$$

or $$K=(Ivfo_1-Ivfo_3)/Io \quad (2)$$

wherein, Io is the magnitude of the sum signal RF_sum in the mirror area.

In Equations 1 and 2, the balance value K is calculated using the magnitude of the synchronous signals detected from the areas vfo1 and vfo3. While it is possible to calculate the balance value K using the magnitude of the synchronous signals detected from the areas vfo2 and vfo4, it is easier to detect the synchronous signals from the areas vfo1 and vfo3 than from the areas vfo2 and vfo4. Also, it is possible to use the value obtained by the combination of the synchronous signals detected in the areas vfo1 and vfo2 and the value obtained by the combination of the synchronous signals detected in the areas vfo3 and vfo4.

When the balance value K obtained in the case that there is no servo error is $K_o$, and the balance value K obtained in the case that a servo error exists is $K_1$ the difference between the two values is defined as follows.

$$K_r=K_o-K_1 \quad (3)$$

Namely, it is possible to know the direction and magnitude of the servo error according to the value and sign of $K_r$.

Here, $K_o$ may be the value measured in a state where there is no servo error, a default value determined by the system controller of a recording/reproducing apparatus, or a value measured in a reference state determined by the system.

In the land track and the groove track, the polarity of $K_1$ should vary in order to calculate $K_r$ correctly since the position of PID1 and PID2 and the position of PID3 and PID4 are inversed.

method of detecting the servo error of the disk using the wobble signal will now be described. Wobble is formed in the land track and the groove track in the DVD-RAM disk. The wobble is in the form of a sinusoidal wave formed on the side wall of the track.

When the disk is tilted in a radial direction, the wobble signal is tilted in the radial direction. Namely, the magnitude of the wobble signal varies between two arbitrary points separated from each other in the radial direction. Therefore, it is possible to detect tilt by detecting the amount of change of the wobble signal in the radial direction.

Figure 6:
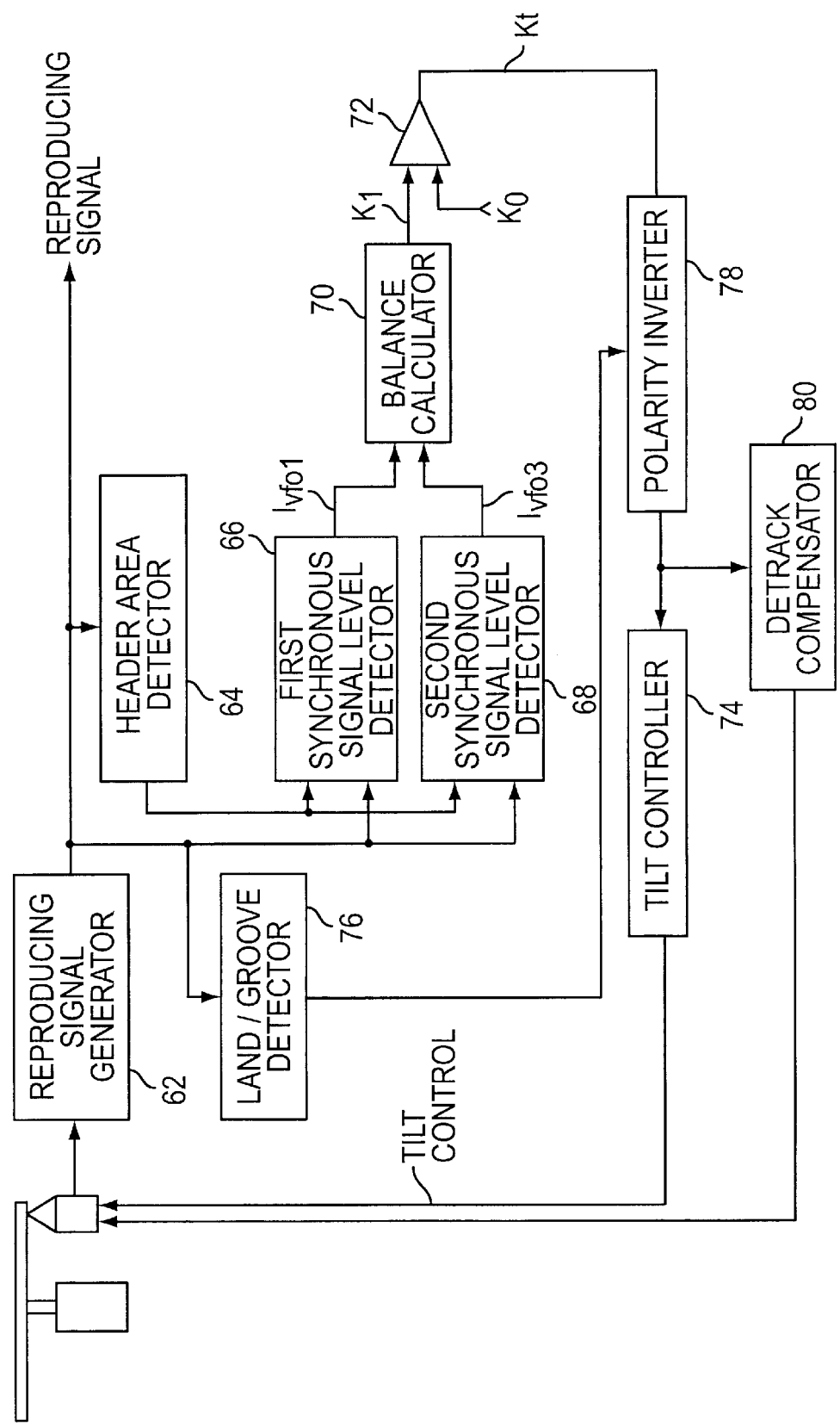
FIG. 6 is a block diagram showing a structure of an apparatus for detecting a servo error according to an embodiment of the present invention.

FIG. 6 is a block diagram showing the structure of an apparatus for detecting the servo error signal according to an embodiment of the present invention. The apparatus shown in FIG. 6 includes a reproducing signal generator 62, a header area detector 64, a first synchronous signal level detector 66, a second synchronous signal level detector 68, a balance calculator 70, a comparator 72, a land/groove detector 76, a tilt controller 74, a polarity inverter 78, and a detrack compensator 80.

Figure 5:
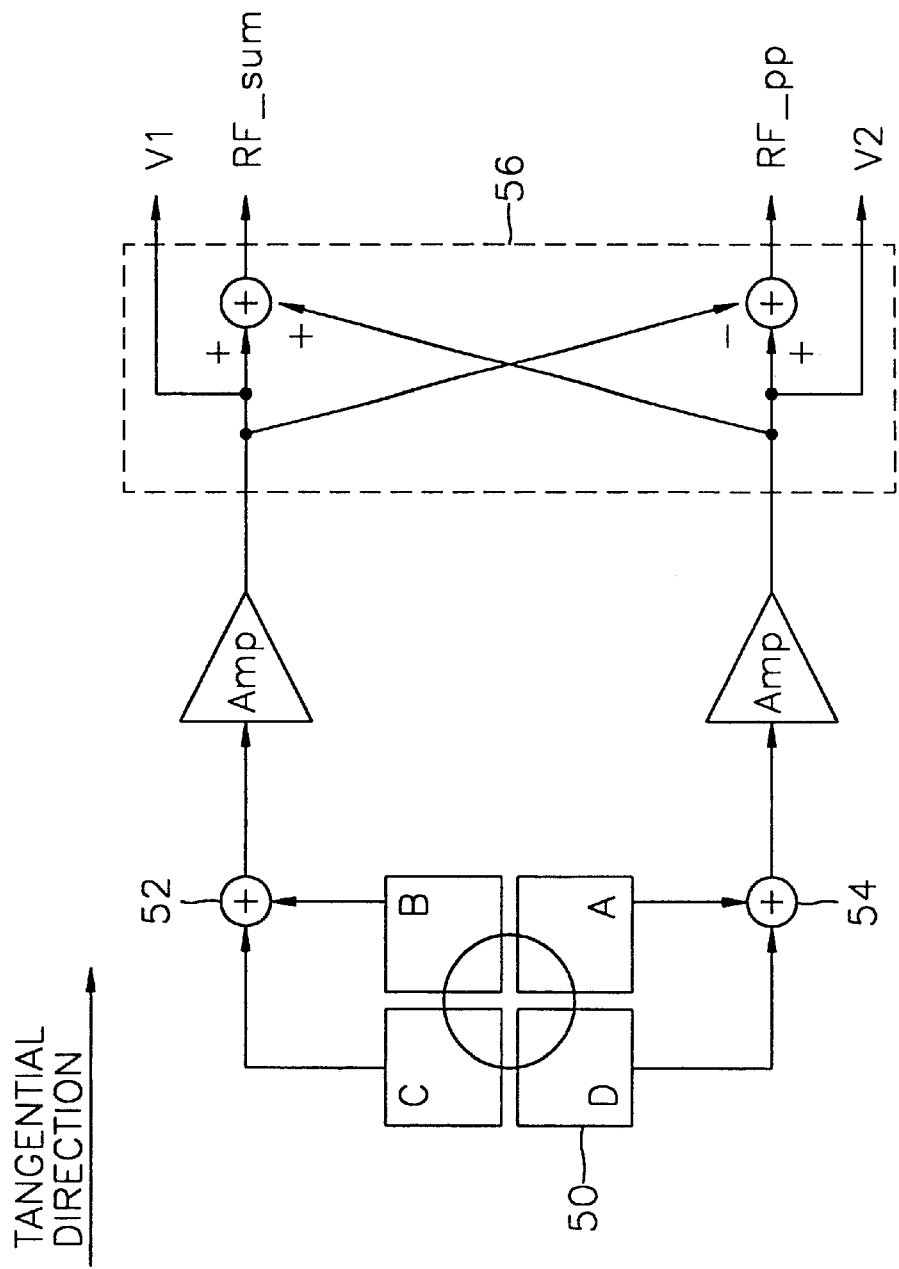
FIG. 5 shows the structure of an apparatus for obtaining the reproducing signal shown in FIG. 4.

The reproducing signal generator 62 generates a sum signal RF_sum, sum signals V1 and V2 of radial pairs, and a push-pull signal RF_pp obtained by subtracting V1 from V2. The reproducing signal generator 62 includes the photodetector divided into four and a calculator as shown in FIG. 5.

The header area detector 64 generates header area signals (a header area signal 1 and a header area signal 2) showing the header area from the reproducing signal. Here, the header area signal 1 is determined from the PID1 and PID2 areas. The header area signal 2 is determined from the PID3 and PID4 areas. Since the header area has an envelope larger than that of the data area, it is possible to obtain a header area signal showing the header area using both an envelope detector for detecting the envelope of the reproducing signal and a comparator.

Figure 4A:
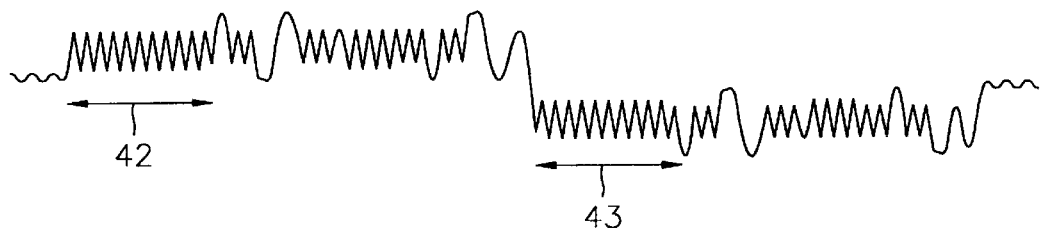
FIGS. 4A and 4B show a push-pull signal and a sum signal which are obtained when a laser spot passes through the header area of the groove track in FIG. 3.
Figure 4B:
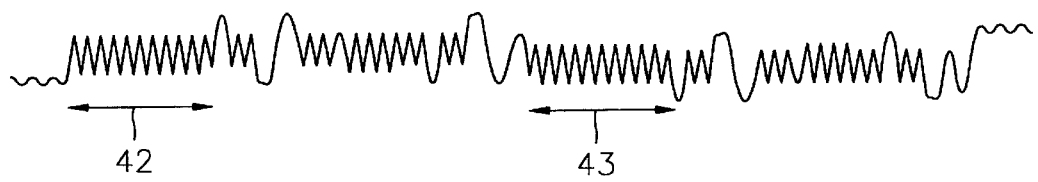

The first synchronous signal level detector 66 synchronized with the header area signal 1 generated by the header area detector 64 detects the magnitude Ivfo1 of the vfo1 signal shown in FIG. 4. To be specific, a first enable signal (enable 1) having a predetermined width and separated from the starting point of the header area signal 1 by a predetermined distance is generated. After gating the reproducing signal by the first enable signal (enable 1), the magnitude Ivfo1 of the vfo1 signal is detected by detecting the peak-to-peak value of the gated reproducing signal.

The second synchronous signal level detector 68 synchronized with the header area signal 2 generated by the header area detector 64 detects the magnitude of the vfo3 signal shown in FIG. 4. To be specific, the magnitude Ivfo3 of the vfo3 signal is detected by generating a second enable signal (enable 2) having a predetermined width and separated from the starting point of the header area signal 2, gating the reproducing signal by the second enable signal (enable 2), and detecting the peak-to-peak value of the gated reproducing signal.

The balance calculator 70 calculates the ratio of the magnitude Ivfo1 of the vfo1 signal detected by the first synchronous signal level detector 66 to the magnitude Ivfo3 of the vfo3 signal detected by the second synchronous signal level detector 68 as shown in Equation 1. Here, the balance calculator 70 can output the mean value of the balance values obtained from several successive sectors in the radial or tangential direction.

The comparator 72 compares the balance value $K_1$ calculated by the balance calculator 70 with a predetermined reference value $K_o$ and outputs the difference between the two values $K_t$ as shown in Equation 3. Here, K may be a value measured in a state where there is no tilt, a default value determined by the system controller of the recording/reproducing apparatus, or a value measured in the reference state determined by the system. The value $K_o$ is a predetermined constant for calculation of $K_1$ and determined to be identical to Equations 1 and 2. In an ideal disk in which the levels of recorded vfo signals are substantially the same and there is no tilt, $K_o$ becomes "0" in Equations 1 and 2. However, in an actual disk, as the ends of recorded vfo signals are not identical, $K_o$ does not become "0."

Figure 1B:
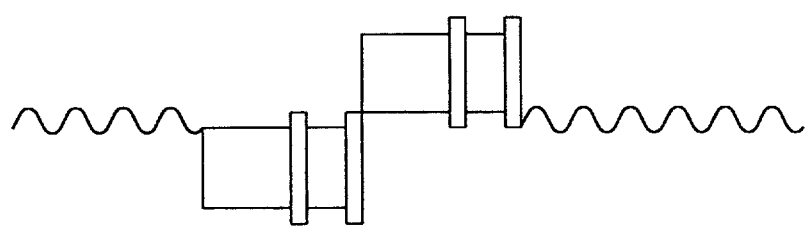
FIG. 1B shows the waveform of a push-pull signal in the land track.
Figure 2A:
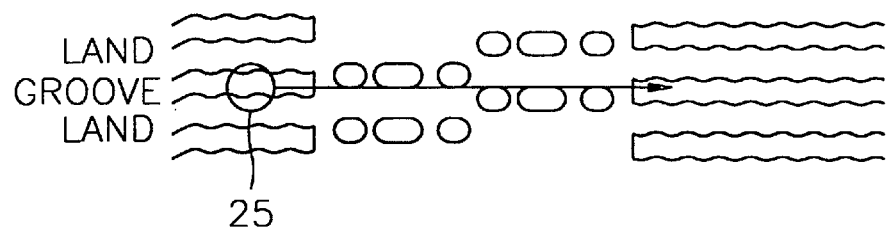
FIG. 2A shows the physical shape of a groove track.
Figure 2B:
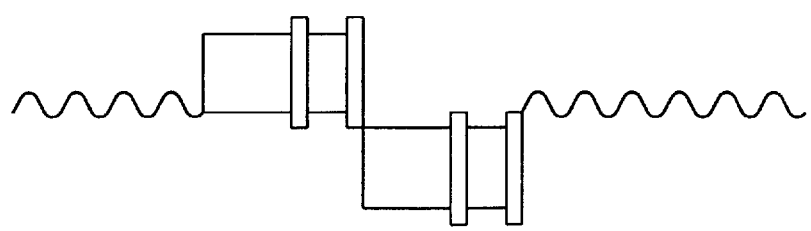
FIG. 2B shows the waveform of a push-pull signal in the groove track.
Figure 3:
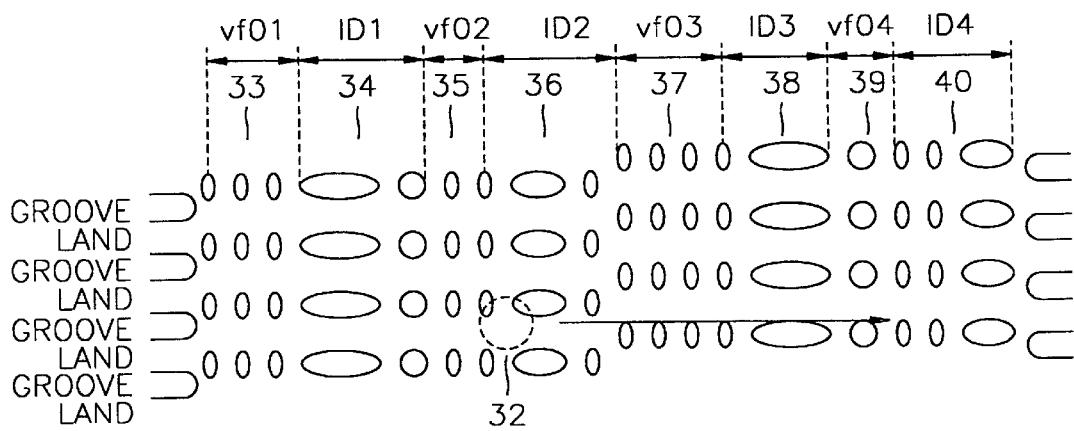
FIG. 3 shows an enlarged header area shown in FIGS. 1A and 2A.

The land/groove detector 76 receives the reproducing signal and detects whether the current track is a land track or a groove track. In the push-pull signal of the land track, the magnitude of the PID1 and PID2 is smaller than that of PID3 and PID4 as shown in FIG. 1B. In the push-pull signal of the groove track, the magnitude of PID1 and PID2 is larger than the magnitude of the PID3 and PID4 as shown in FIG. 2B. The land/groove detector 76 discriminates the land track from the groove track using the above procedure.

The polarity inverter 78 inverts the polarity of the subtraction value $K_1$ output from the comparator 72 according to the result detected by the land/groove detector 76.

The balance value can be used in order to compensate for tilt.

The tilt controller 74 controls the tilt of the disk according to the subtraction value $K_t$ the polarity of which is inverted and which is output from the polarity inverter 78. Since the sign and magnitude of the subtraction value $K_t$ show the direction and magnitude of the tilt, the tilt of the disk is controlled by feeding back the sign and the magnitude of the subtraction value $K_t$.

The balance value can be used in order to correct detrack.

The detrack compensator 80 controls the detrack of the disk according to the subtraction value $K_t$ the polarity of which is inverted and which is output from the polarity inverter 78. Since the sign and magnitude of the subtraction value $K_t$ shows the direction and magnitude of the detrack, the detrack of the disk is controlled by feeding back the subtraction value $K_t$.

Figure 11:
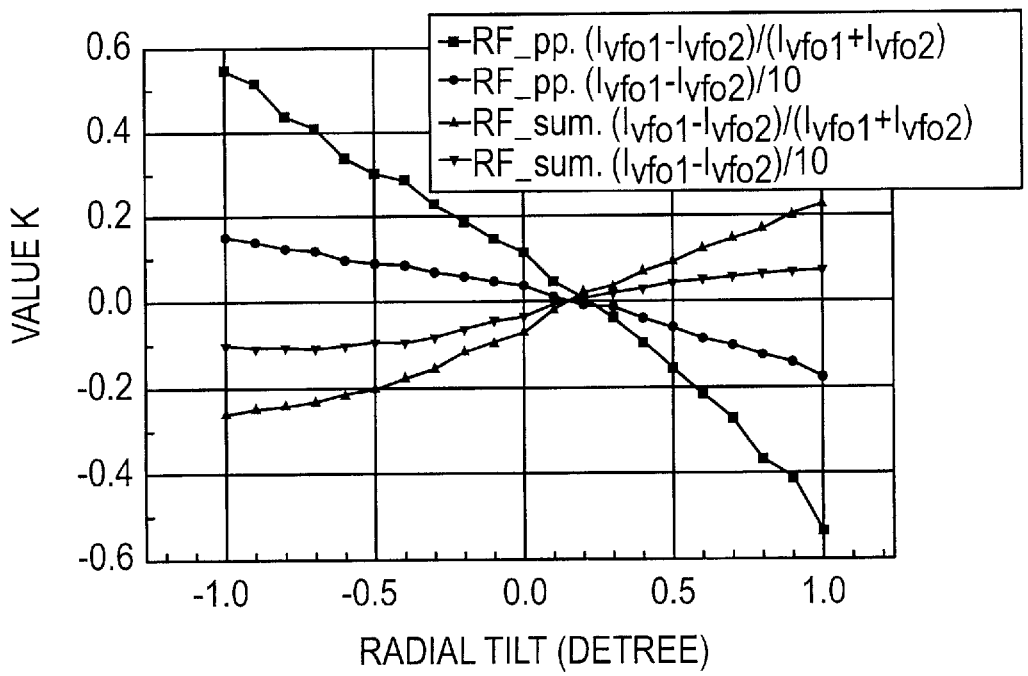
FIG. 11 is a graph showing the relationship between radial tilt and a balance value K in the method and apparatus according to the present invention.
Figure 12:
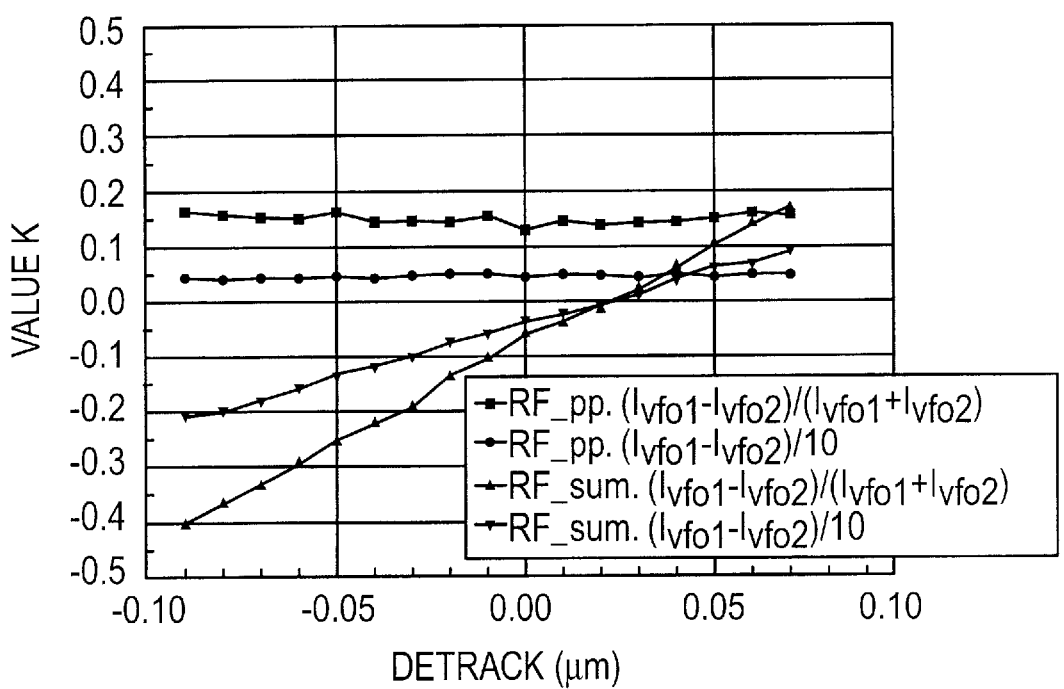
FIG. 12 is a graph showing the relationship between detrack and the balance value K in the method and apparatus according to the present invention.

The resolution of the sign and magnitude of the subtraction value $K_t$ varies depending upon the signal used (see the description relating to FIGS. 11 and 12, et seq.)

Figure 7:
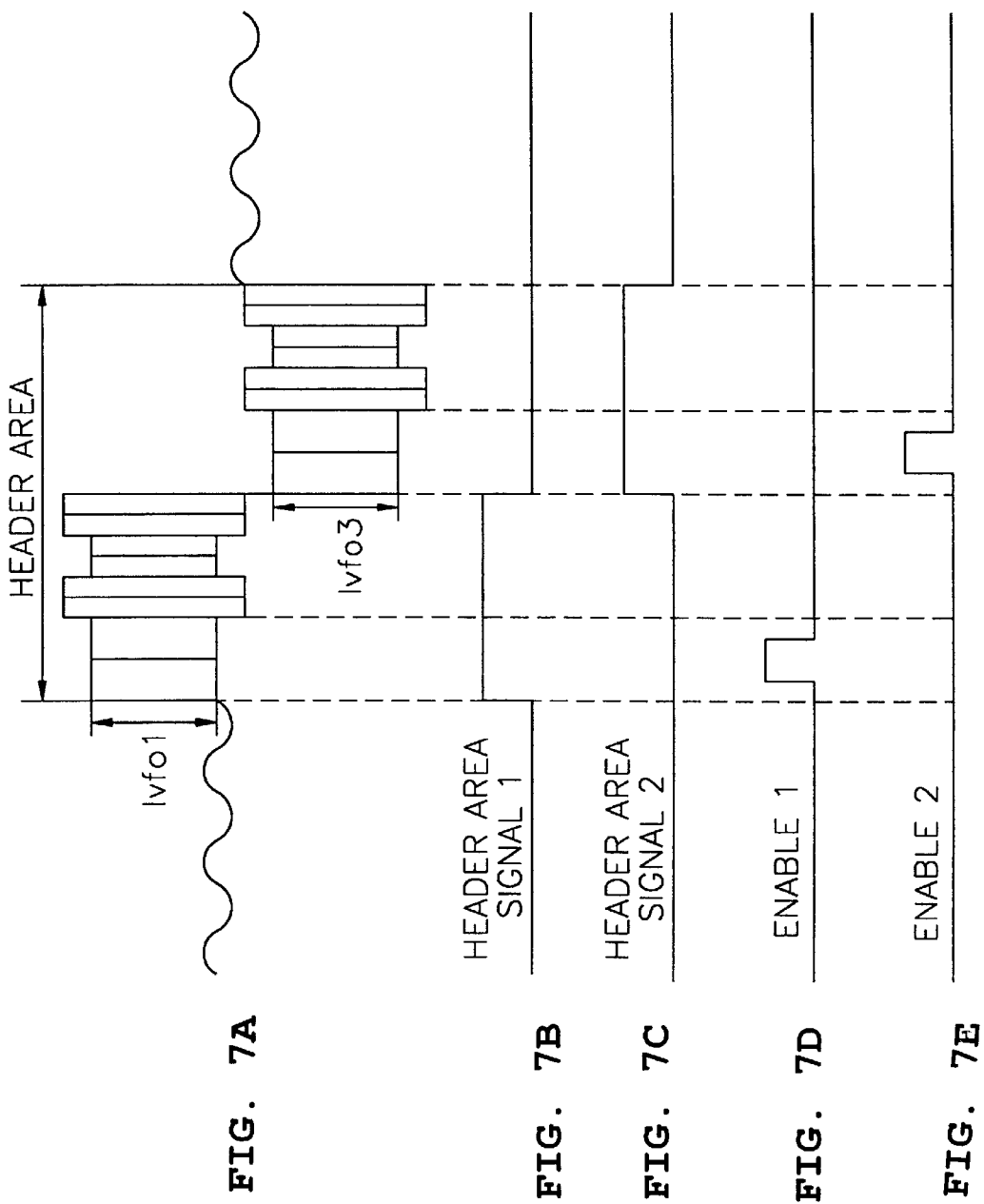
FIGS. 7A through 7E show waveforms generated during the operation of the apparatus shown in FIG. 6.

FIGS. 7A through 7E show the waveforms generated by the operation of the apparatus shown in FIG. 6. FIG. 7A shows the waveform of the push-pull signal generated by the reproducing signal generator 62. FIGS. 7B and 7C show the waveforms of the header area signal 1 and the header area signal 2, respectively, generated by the header area detector 64. FIGS. 7D and 7E show the waveforms of the first enable signal (enable 1) and the second enable signal (enable 2) used by the first synchronous signal level detector 66 and the second synchronous signal level detector 68 respectively.

Figure 8:
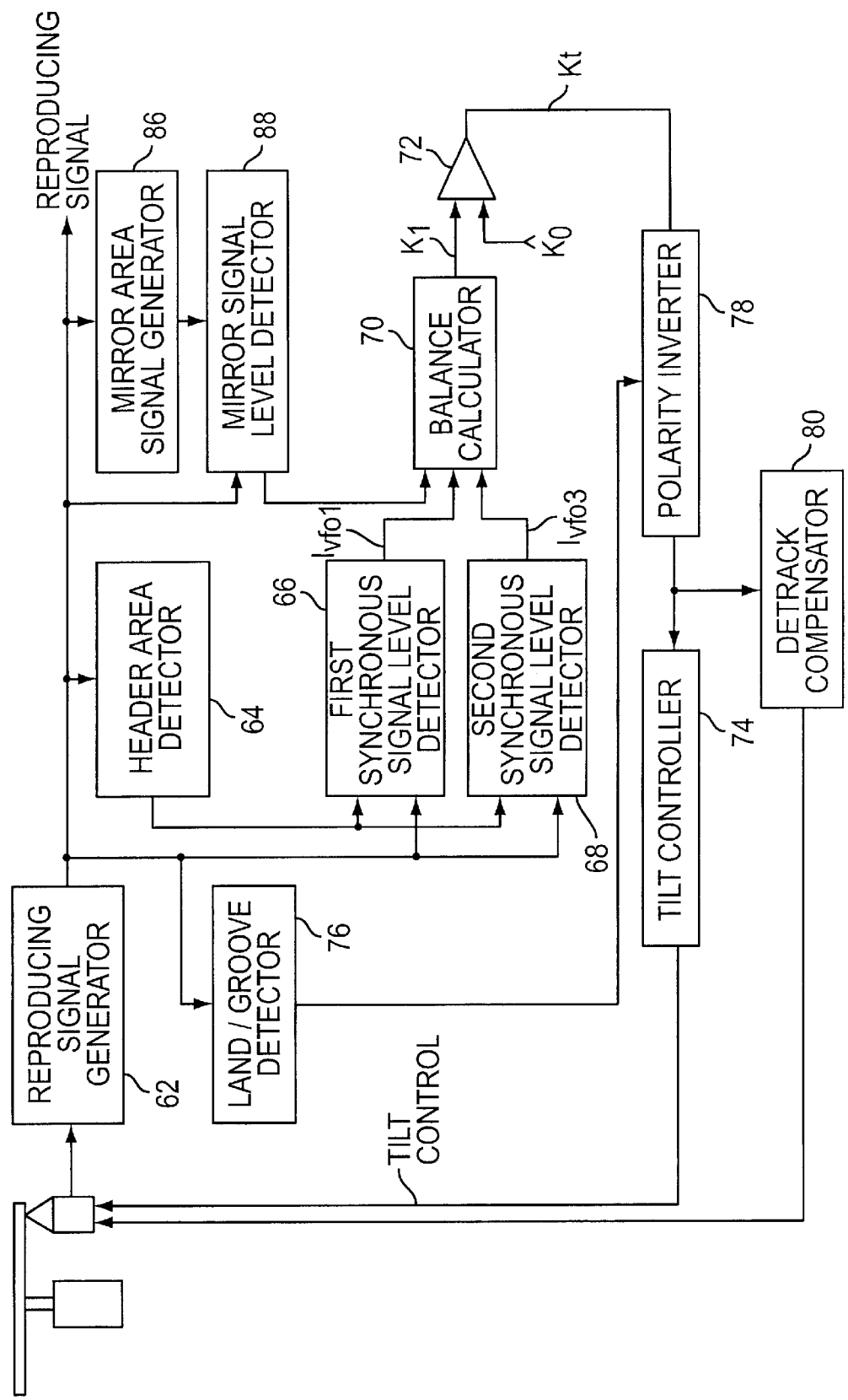
FIG. 8 is a block diagram showing a structure of an apparatus for detecting the servo error according to another embodiment of the present invention.

FIG. 8 is a block diagram showing a structure of an apparatus for generating the servo error signal according to another embodiment of the present invention. The apparatus shown in FIG. 8 is similar to the apparatus shown in FIG. 6. except that the apparatus shown in FIG. 8 includes a mirror area signal generator 86 and a mirror signal level detector 88. Therefore, the same reference numerals are used for the same members and a detailed description thereof is omitted.

The mirror area signal generator 86 generates a mirror area signal showing a mirror area from the sum signal RF_sum provided by the reproducing signal generator 62. In the push-pull signal RF_pp, since the mirror signal becomes zero, it is not possible to obtain the mirror area signal by the push-pull signal RF_pp.

It is possible to generate the mirror area signal by the envelope detector and the comparator since the mirror signal has a much lower envelope than the signals of the data area and the header area.

The mirror signal level detector 88 detects the level of the mirror signal obtained from the sum signal RF_sum and output by the mirror area signal generator 86. The mirror signal level detector 88 generates a third enable signal (enable 3) having a period according to the mirror area signal generated by the mirror area signal generator 86, gates the sum signal RF_sum by the third enable signal (enable 3), and detects the peak-to-peak value of the gated sum signal RF_sum, to generate a mirror signal level lo.

The balance calculator 72 calculates the balance value $K_1$ as shown in Equation 2 based upon the level Ivfo1 of the vfo1 signal detected by the first synchronous signal level detector 66, the level Ivfo3 of the vfo3 signal detected by the second synchronous signal level detector 68, and the mirror signal level lo detected by the mirror signal level detector 88. Here, the balance calculator 72 can output the mean value of the balance values obtained from several successive sectors in the radial or tangential direction.

FIGS. 9A and 9B show waveforms generated during the operation of the apparatus shown in FIG. 8. FIG. 9A shows the waveform of the mirror area signal output from the mirror area signal generator 86. FIG. 9B shows the waveform of the third enable signal (enable 3).

According to the present invention, it is possible to use the push-pull signal RF_pp, the sum signals V1 and V2 of the radial pairs, and the sum signal RF_sum for detecting the servo error since the servo error is detected by the balance value of the synchronous signals. For example, when the push-pull signal RF_pp is used, it is possible to compensate for tilt in the radial direction. When the sum signal RF_sum is used, it is possible to compensate for tilt in the tangential direction.

FIG. 11 is a graph showing the relationship between the radial tilt and the balance value K in the methods and apparatuses according to the embodimens of the present invention. In FIG. 11, the horizontal axis denotes radial tilt values and the vertical axis denotes balance values K. In FIG. 11, the graph marked with ▲ shows a case where the sum signal RF_sum and the balance value according to Equation 1 are used. The graph marked with ▼ shows a case where the sum signal RF_sum and the balance value according to Equation 2 are used. The graph marked with ● shows a case where the push-pull signal RF_pp and the balance value according to Equation 2 are used. The graph marked with ■ shows a case where the push-pull signal RF_pp and the balance value according to Equation 1 are used.

As shown in FIG. 11, the radial tilt is best described by the case marked with ■ where the push-pull signal RF_pp and the balance value according to Equation 1 are used. The case marked with ● where the push-pull signal RF_pp and the balance value according to Equation 2 are used is also useful for describing the radial tilt.

Therefore, it is possible to determine the tilt by the values according to Equations 1 and 2 using the push-pull signal RF_pp.

FIG. 12 is a graph showing the relationship between the detrack and the balance value K in the methods and apparatuses according to the embodiments of the present invention. In FIG. 12, the horizontal axis denotes the amount of the detrack. The vertical axis denotes the balance value K. In FIG. 12, the graph marked with ▲ shows a case where the sum signal RF_sum and the balance value according to Equation 1 are used. The graph marked with ▼ shows a case where the sum signal RF_sum and the balance value according to Equation 2 are used. The graph marked with ● shows a case where the pushpull signal RF_pp and the balance value according to Equation 2 are used. The graph marked with ■ shows a case where the push-pull signal RF_pp and the balance value according to Equation 1 are used.

As shown in FIG. 12, the graph marked with ▲ shows the case where the sum signal RF_sum and the balance value according to Equation 1 is most affected by the detrack. The graph marked with ■ shows the case where the push-pull signal RF_pp and the balance value according to Equation 1 is least affected by the detrack.

Therefore, it is possible to determine the detrack by the value according to Equation 1 or 2 using the sum signal RF_sum.

The quality of the servo error signal varies according to the quality of the disk and the conditions of the system. However, when the value of the servo error signal is not restricted to some degree, it is not possible to recognize the PIDs or it is difficult to stably manage the servo. Therefore, in the disk, the value $K_o$ is preferably managed to maintain a prescribed level.

Accordingly, in the present invention, it is suggested that the value $K_o$ be restricted to ±0.1. This value is required to normally reproduce each PID when a standard amount of tilt ±0.35° is given. Also, the allowance range of the track control is considered.

Also, it is necessary to restrict the value $K_t$ to no more than a predetermined value to precisely control the servo in the apparatus for reproducing data from the disk. When the quality of the servo is not strictly managed when the data is reproduced, it is not possible to obtain the PID information.

Therefore, in the present invention, it is suggested that the value $K_t$ be restricted to ±0.1 in the servo operation of the reproducing apparatus.

It is possible to correctly detect the tilt state of the disk without a specific pattern for detecting the servo error by the method for detecting the servo error according to the present invention.

It is possible for the recording/reproducing apparatus to stably control the servo and to maintain an optimal recording/reproducing state since the apparatus for generating the servo error signal according to the present invention correctly detects the servo error state of the disk.

It is possible for the recording/reproducing apparatus to stably control the servo and to maintain the optimal recording/reproducing state since it is possible to strictly manage the level of the servo error signal which is the basis of controlling the servo by the disk according to the present invention.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of detecting a servo error of a recording and/or reproducing apparatus for recording data on and reproducing data from a disk in a data area of which reference patterns having a uniform size are recorded, the method comprising:

determining a first magnitude of the reference patterns recorded on at least two positions separated from each other and a second magnitude of a reproducing signal corresponding to the reference patterns; and detecting the servo error in accordance with a ratio of the first magnitude to the second magnitude.

2. The method of claim 1, wherein the disk is divided into sectors and each reference pattern is a synchronous signal included in a header area in which the addresses of the sectors are recorded.

3. The method of claim 1, wherein the disk comprises a land track and a groove track and each reference pattern is a wobble signal for separating the land track from the groove track in a radial direction of the disk.

4. A method of detecting a servo error of an apparatus for reproducing data from an optical disk in which a recording area is divided into sectors, each sector has a header for indicating an address, each header has a first header and a second header which are recorded to deviate from a center of a track in opposite directions, and the first header and the second header have address areas in which address signals of the sectors are recorded and synchronous signal areas in which synchronous signals for detecting the address signals recorded in the address areas are recorded, the method comprising:

determining a level Ivfo1 of a first synchronous signal of a reproducing signal in the first header and a level Ivfo3 of a second synchronous signal in the second header; and detecting a servo error in accordance with a ratio of a magnitude of Ivfo1 to a magnitude of Ivfo3.

5. The method of claim 4, wherein the magnitude ratio is (Ivfo−Ivfo3)/(Ivfo+Ivfo3).

6. The method of claim 4, wherein the magnitude ratio is (Ivfo−Ivfo3)/Io, wherein Io is a level of a mirror signal.

7. The method of claim 4, wherein the reproducing signal is a sum signal of radial pairs in a photodetector divided into four sections.

8. The method of claim 4, wherein the reproducing signal is a push-pull signal RF_pp and the detected servo error is a tilt error signal.

9. The method of claim 4, wherein the reproducing signal is a sum signal RF_sum and the detected servo error is a tracking error signal.

10. The method of claim 4, wherein the detecting of the servo error comprises determining the magnitude ratio by averaging magnitude ratios obtained from a plurality of sectors adjacent to each other in a tangential direction.

11. The method of claim 4, wherein the detecting of the servo error comprises determining the magnitude ratio by averaging magnitude ratios obtained from a plurality of sectors adjacent to each other in a radial direction.

12. The method of claim 4, wherein the optical disk has a plurality of land/groove tracks, and the method further comprises inverting the magnitude ratio in each land/groove track.

13. A method of recording data on and reproducing data from a disk in which a recording area is divided into sectors, each sector has a header comprising an address, each header has a first header and a second header recorded to deviate from the center of the track in opposite directions, and the first header and the second header have address areas in which address signals of sectors are recorded and synchronous signal areas in which synchronous signals for detecting the address signals recorded in the address areas are recorded, the method comprising:

determining a first magnitude Ivfo1 of the synchronous clock signal in the first header and a second magnitude Ivfo3 of the synchronous clock signal in the second header and controlling a servo so that the ratio of the first magnitude Ivfo1 to the second magnitude Ivfo3 satisfies a predetermined restricted value.

14. The method of claim 13, wherein the restricted value is ±0.1.

15. A method of detecting a servo error of a disk, comprising:

determining a first magnitude $I1$ of uniformly sized reference patterns recorded on at least two positions of an area of the disk, and determining a second magnitude $I2$ of a reproducing signal corresponding to the reference patterns; and detecting a servo error based on a magnitude ratio of $I1$ to $I2$.

16. The method of claim 15, wherein the disk is divided into sectors and each reference pattern is a synchronous signal included in a header area in which addresses of the sectors are recorded.

17. The method of claim 15, wherein the disk comprises a land track and groove track and each reference pattern is a wobble signal separating the land track from groove track.

18. The method of claim 15, wherein the magnitude ratio is $(I1-I2)/(I1+I2)$.

19. The method of claim 15, wherein the magnitude ratio is $(I1-I2)/Io$, where Io is a level of a mirror signal.

20. The method of claim 15, wherein the reproducing signal is a signal from sections of a photodetector divided into sections.

21. The method of claim 15, wherein said detecting of servo error based on a magnitude ratio includes averaging magnitude ratios obtained from a plurality of sectors of the disk adjacent to each other.

* * * * *

UNITED STATES PATENT AND TRADEMARK OFFICE
CERTIFICATE OF CORRECTION

PATENT NO. : 6,721,243 B2
DATED : April 13, 2004
INVENTOR(S) : Seong-sin Joo et al.

It is certified that error appears in the above-identified patent and that said Letters Patent is hereby corrected as shown below:

Title page,
Item [56], References Cited, FOREIGN PATENT DOCUMENTS, insert
-- JP 59-38939     3/3/84     JAPAN
   JP 4-76828     3/11/92     JAPAN
   JP 9-251639     09/22/97     JAPAN
   196 49 970 A1     6/5/97     DE
   WO 92/04712     3/19/92     PCT --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,721,243 B2
DATED : April 13, 2004
INVENTOR(S) : Seong-sin Joo et al.

It is certified that error appears in the above-identified patent and that said Letters Patent is hereby corrected as shown below:

Title page,
Item [56], References Cited, U.S. PATENT DOCUMENTS, insert:
-- 6,091,700   07/2000   Kobayashi
   6,064,643   05/2000   Tanoue et al.
   5,550,799   08/1996   Inoue et al.
   5,986,592   11/1999   Nakagawa et al.
   5,130,963   07/1992   Kusano et al. --;
FOREIGN PATENT DOCUMENTS, insert:
-- JP 10-11762      1/1998
   JP 1-235081     9/1989
   JP 10-208250    8/1998
   JP 9-63085      3/1997
   JP 10-27366     1/1998
   JP 5-144024     6/1993
   EP 0 798 711A2  1/1997 --; and insert:
-- OTHER DOCUMENTS,
U.S. Patent Apllicaiton No. 09/629,049      July 31, 2000    Seong-sin JOO et al.
U.S. Patent Application No. 09/629,050      July 31, 2000    Seong-sin JOO et al.
Grohov, P.K., "Encyclopedic Dictionary of Electronics," pp. 24-25, Moscow, Russian language, 1993
English Abstract of JP 09161274A, from which DE 196 49 970 A1 claims priority --.

Signed and Sealed this

Twentieth Day of December, 2005

JON W. DUDAS
*Director of the United States Patent and Trademark Office*